United States Patent [19]
Briese

[11] Patent Number: 4,828,436
[45] Date of Patent: May 9, 1989

[54] CUTTING TOOL CARTRIDGE ARRANGEMENT

[76] Inventor: Leonard A. Briese, 5039 Browndeer La., Rancho Palos Verdes, Calif. 90274

[21] Appl. No.: 102,038
[22] Filed: Sep. 29, 1987
[51] Int. Cl.⁴ ............................................. B23P 15/28
[52] U.S. Cl. ........................................ 407/76; 407/40; 407/42; 407/38; 407/44; 407/46; 407/86; 407/101
[58] Field of Search ...................... 407/7, 64, 101, 38, 407/88, 36, 76, 73, 65, 62, 44, 42, 45, 46, 40, 66, 30, 33, 34, 11, 86

[56] References Cited
U.S. PATENT DOCUMENTS 2,862,286 12/1958 Williams ............................... 407/38
3,262,184 7/1966 Sweeny ................................ 407/73
4,682,916 7/1987 Briese .................................. 407/11

FOREIGN PATENT DOCUMENTS 0776939 10/1933 France .

Primary Examiner—Frederick R. Schmidt
Assistant Examiner—Blynn Shideler
Attorney, Agent, or Firm—Don B. Finkelstein

[57] ABSTRACT

A cutting-tool cartridge arrangement for rotary cutting-tools in which the cutting-tool cartridge assembly is mountable in a aperture provided in the body member of the cutting-tool. The cutting-tool cartridge assembly has a split bushing for insertion into the aperture in the body member of the tool and the bushing is annular in shape, has internal threads and has a slot in the wall thereof extending from the threaded inside surface to the outside surface to provide a pair of opposed surfaces resiliently movable towards and away from each other. A set screw aperture is provided in the body member of the tool into which a set screw may be inserted and tightened against the split bushing. The stud seat having external threads is threaded into the split bushing and the stud seat also has a cutting insert end having matching walls that match the wall configuration of the mounting walls of a frustum cutting insert. A clamping nut threadingly engages the threaded walls of the stud seat at the cutting insert end thereof and has internal walls configured to match the flank surface of the frustum cutting insert. Tightening the clamping nut on the stud seat clamps the frustum cutting insert therebetween. Adjustment to the position of the insert may be made by threading the stud seat in or out of the split bushing until the cutting surface of the cutting insert is at the desired location. The set screw is then tightened to force the opposed walls of the slot in the split bushing means towards each other thereby clamping the threads of the split bushing on to the external threads of the stud seat to prevent any further movement or rotation of any portion of the cartridge assembly, including the insert during cutting operation of the cutting-tool.

30 Claims, 6 Drawing Sheets

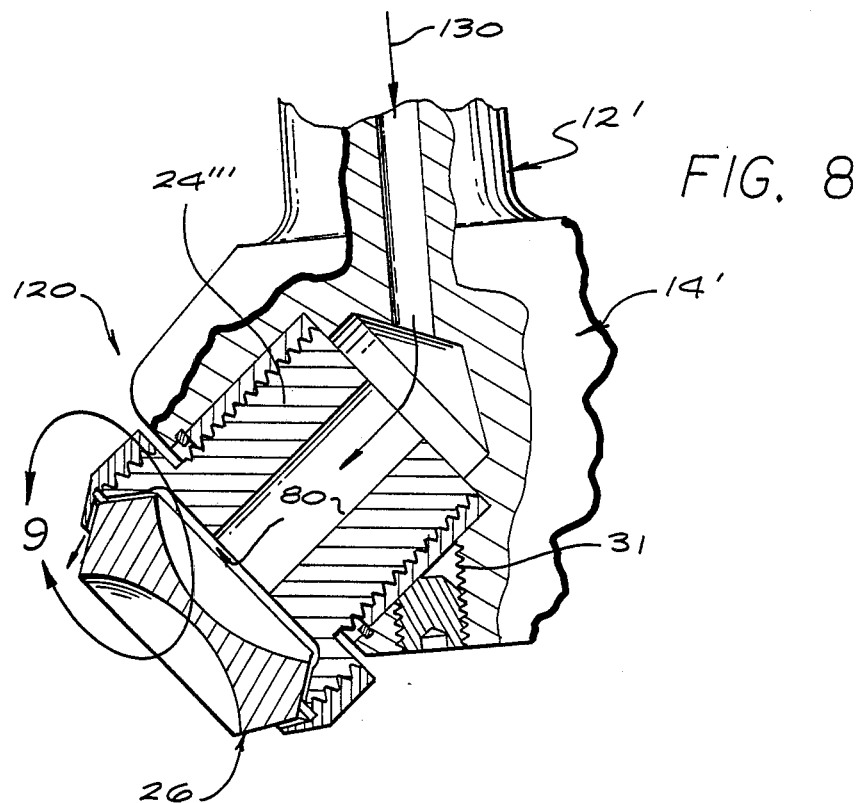
FIG. 8
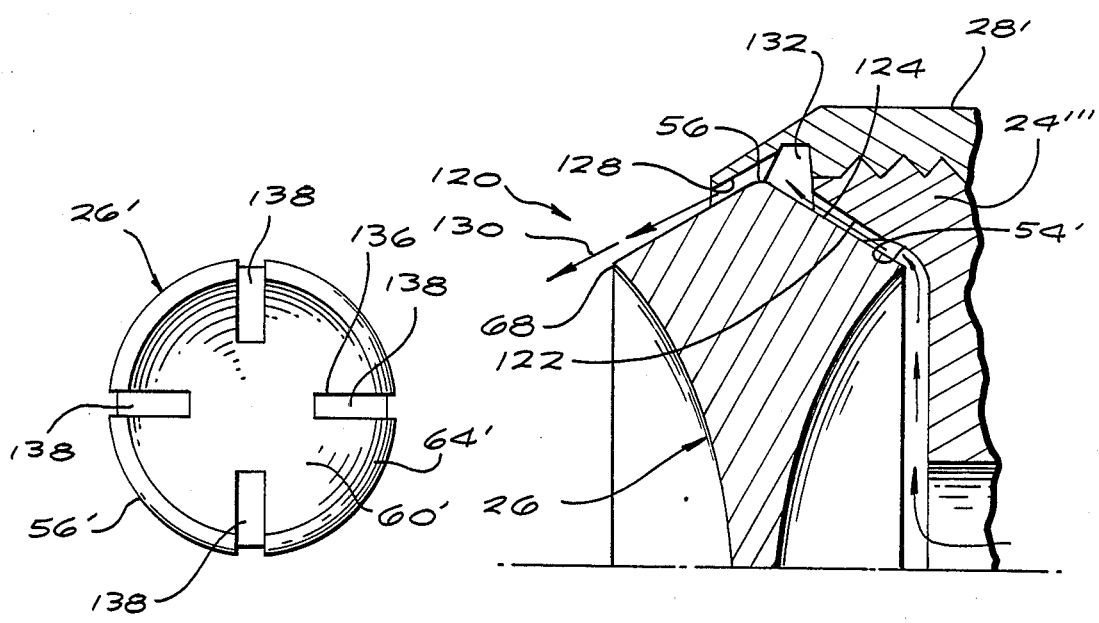
FIG. 10
FIG. 9

CUTTING TOOL CARTRIDGE ARRANGEMENT

BACKGROUND OF THE INVENTION

1. Field of the Invention

This invention relates to the cutting tool art and more particularly to an improved cartridge insert arrangement for a rotary cutting tool.

2. Description of the Prior Art

Rotary cutting tools are, of course, very well known in the art. Such cutting tools as milling machines, lathes, boring tools, planing tools etc. have long been utilized in the material shaping field. Such cutting tools generally have one or more cutting inserts mounted thereon and rotation of the cutting tool causes the cutting insert to engage the workpiece and cut a predetermined amount of material therefrom. In such cutting tools, many are provided with means for adjusting the position of the cutting insert with respect to a nominal or "zero" plane. Where more than one cutting insert is utilized on the tool it is desirable to have all of the cutting inserts adjusted to the same position with respect to the zero plane. Such adjustment, of course, is also desired in cutting tools in which only a single cutting insert is provided.

Such adjustments in the past have generally not provided the degree of accuracy that is desired. For example, in some rotary cutting tools the cutting inserts in their mounting cartridges could only be adjusted when removed from the cutting tool. In others, the cartridges could only be adjusted to ±0.0002 inches. This comparatively large tolerance far exceeds that which is desired in many applications.

Additionally, in many applications it is also desired to provide adjustment of the cutting insert or inserts towards and away from the center line of rotation of the cutting tool. Many cutting tools did not have any such radial adjustment capability and, with those that do, the tolerance range for such radial adjustments was often no better than the abovementioned 0.0002 inches achieved for the so called axial adjustments towards and away from the zero plane.

Additionally, in some machining operations it is desired that the cutting insert of the cutting tool remain stationary with respect to its own center line. That is, it is preferred that the only rotation be provided by the rotation of the cutting tool and that the cutting insert is stationary or fixed with respect thereto. In other machining operations it is desired that the cutting insert also rotate about its own axis during the rotation of the cutting tool about the cutting tool axis. Heretofore there has not in general been provided a completely satisfactory cutting tool arrangement in which both a fixed cutting insert or a rotating cutting insert may be installed and interchanged as desired for particular machining operations. Further, it is often desired to change the physical size of the cutting insert depending upon the maching operation being performed. Cutting tools heretofore available have, in general, not been able to accept cutting inserts of more than one size.

In many of the heretofor available cutting tools, it has been a comparatively time consuming task to make the necessary adjustment of the cutting insert or inserts towards and away from the zero plane and or comparatively complex cartridge arrangements for holding the cutting insert have been utilized with the consequent increase in cost and reliablity associated with larger numbers of components.

Therefore, there has long been a need for an improved cartridge assembly for a cutting insert in a rotary cutting tool that provides a high degree of precision in adjustment of the cutting insert, such adjustments may be quickly and easily made while the cutting insert is installed on the cutting tool both rotating and fixed cutting inserts may be utilized interchangably, and that a comparatively small number of parts be utilized in order to provide a higher degree of reliability.

SUMMARY OF THE INVENTION

Accordingly, it is a object of the present invention to provide an improved cutting tool cartridge arrangement for rotary cutting tools.

It is another object of the present invention to provide an improved cutting tool cartridge assembly that allows high precision adjustment of the cutting insert while the cartridge assembly is mounted in the cutting tool.

It is another object of the present invention to provide a cutting tool cartridge arrangement for a rotary cutting tool that has comparatively few parts and has a high degree of reliability.

It is another object of the present invention to provide a improved cartridge assembly for retaining a cutting insert in a rotating cutting tool and in which both a rotating and nonrotating insert may be installed in the same rotating cutting tool as desired.

The above and other objects of the present invention are achieved, according to a preferred enbodiment thereof, in a fixed cutting tool cartridge by having an annular bushing means that has a predetermined axis, a first end and a second end axially spaced from the first end, and an outside surface. The outside surface is mountable in an appropriately configured aperture in a rotating cutting tool. The rotating cutting tool may have one or more such apertures for receiving a cartridge of the present invention. The annular bushing has a threaded inside surface and a slot is provided in the wall of the annular bushing extending from the outside surface to the threaded inside surface and from the first end to the second end. This slot provides a pair of spaced apart walls which are resiliently movable towards and away from each other. The resiliency of the movement is, of course, determined by the material of which the split bushing means is fabricated. Such material may of course be steel or any other desired material suitable for the purpose.

The rotating cutting tool is also provided with a set screw aperture adjacent to and comunicating with the aperture or appertures which receive the cutting tool cartridge. A set screw is positionable therein and bears against the outer surface of the split bushing means to move the spaced apart walls towards each other to provide a clamping action as decribed below in greater detail.

A stud seat means which has a threaded outside surface is mountable in the split bushing means for threading engagement with the inside surface thereof. The outer end of the stud seat means is provided with internal walls having a contour matching the mounting walls of a cutting insert means.

The cutting insert means is generally a frustum type cutting insert and in general is similar to the cutting inserts of my Pat. No. 4,621,955. Such a cutting insert has a medial plane and a flank surface extending from the medial plane and tapering inwardly towards the axis of the cutting insert to the cutting edge of the cutting insert. On the opposite side of the medial plane the cutting insert has a mounting surface also tapering inwardly towards the axis. In some embodiments of the present invention the cutting insert is reversible so that the mounting surface becomes the flank surface and the flank surface becomes the mounting surface. The cutting insert is mountable in the stud seat means for engagement of the mounting surface of the cutting insert with the matching wall surface of the stud seat means.

A clamping nut means has an internal thread at the inner end thereof for threading engagement with a thread on the outer surface of the stud seat means in regions adjacent the region in which the cutting insert is mounted. The clamping nut is also provided with internal walls on its outer end for engagement with the flank surface of the cutting insert. Tightening of the clamping nut clamps the cutting insert between the clamping nut and the stud seat means and thus prevents any relative movement of the cutting insert means with respect to both the stud seat means and the clamping nut. Axial adjustment of the cutting edge of the cutting insert may be made by loosening the set screw and rotating the assembly of the cutting insert, clamping nut and stud seat means until the desired axial position of the cutting insert cutting edge is obtained. The set screw is then tightened causing the opposed walls of the split bushing means to move towards each other. This provides a clamping action of the threads of the split bushing means with the threads of the stud seat means and prevents any relative motion of the stud seat means with respect to the split bushing means.

In some other embodiments of the present invention it is desireable to provide a coolant flow at the cutting edge of the cutting insert. In such an embodiment the cutting tool is provided with a coolant dispensing system of conventional design. The cutting insert cartridge of the present invention is provided with appropriate coolant flow channels. Such coolant flow channels may, for example, comprise a substantially axial aperture extending through the stud seat means to provide communication at the inner end thereof with the coolant dispensing system of the tool. At the outer end of the stud seat means channels are provided in the matching surface and communicating with the axial aperture in the stud seat means. The generally annular space is provided between the outer surface of the stud seat means at the outer end thereof, a small region of the cutting insert at the medial plane thereof, and the inner surface of the clamping nut. This generally annular space communicates with the channels in the matching surface of the stud seat means. Channels are also provided in the clamping surface of the clamping nut that engages the flank surface of the cutting insert means and these channels in the clamping surface communicate with the above mentioned generally annular space to allow coolant to flow in such channels and impinge upon the cutting edge of the cutting insert where it cuts the material of the work piece.

If it is desired to index the cutting insert so that a different portion thereof is to do the cutting, the set screw is left in the tightened condition and the clamping nut is loosened, for example, a quarter turn. This loosens the clamping action so that the cutting insert may be indexed any desired number of degrees. The clamping nut is then retightened.

By selecting various sizes of clamping nuts and cutting inserts and selecting appropriate sized stud seat means having matching walls to match the size of the cutting insert, a plurality of different sized cutting inserts may be interchangeably mounted in the same cutting tool since the inner end of the stud seat means may have the same thread diameter for engagement with the inner threaded surface of the split bushing means.

It has been found that axial alignment of the cutting edge may be quickly and easily done with a high degree of accuracy according to the principles of the present invention. The set screw, as noted above, is loosened and the remainder of the cartridge assembly is rotated thereby moving the cutting insert cutting edge. The accuracy of positioning has been found to be on the order of plus or minus 0.000050 inches, approximately an order of magnitude better accuracy than some prior art cutting tool arrangements.

In another embodiment of the present invention a rotating cutting insert is provided which can be mounted interchangeably in the same cutting tool as the above described fixed cutting insert.

In other embodiments of the present invention a cutting tool cartridge arrangement is provided in which the cutting insert means rotates about its axis during the rotation of the cutting tool about the cutting tool axis during the machining operation. In such an embodiment the split bushing as above described is the same and is insertable into an appropriately sized aperture in the body of the cutting tool. Thus, since the split bushing is the same, it will be appreciated that both rotating and non-rotating cutting inserts may be used interchangeably as desired in the same cutting tool. In the rotating cutting insert of the embodiment, a bearing means having external threads is inserted into the split bushing means for threading engagement with the internal threads thereof and the bearing means has an internal bearing surface extending from the outer end to the inner end and tapering inwardly from the outer end towards the axis of rotation at the inner end. A spindle means having a tapered external bearing surface is mounted in the bearing means and the external bearing surface of the spindle means rotatably engages the internal bearing surface above the bearing means. The inner end of the spindle means has retentive means for retaining the spindle in bearing relationship to the bearing means. The external end of the spindle means has external threads and cutting insert matching surface into which a cutting insert may be positioned so that the cutting insert matching surface engages the mounting surface of the cutting insert. The cutting insert may be identical to the above described cutting insert utilized in the non-rotating embodiment described above.

A clamping nut which may be the same as the clamping nut described above for the non-rotating embodiment, threadingly engages the external threads on the spindle means and has a clamping surface for engagement with the flank surface of the cutting insert to clamp the cutting insert between the clamping nut and the spindle means.

Retaining means, such as a snap ring, may be utilized in both the rotating and non-rotating cutting insert embodiments to retain the split bushing means and the body member of the cutting tool.

In the rotating cutting insert embodiment, coolant flow may also be provided by appropriate coolant flow passages. In one embodiment an axially extending coolant flow passage is provided through the spindle means from the inner end to the outer end. Coolant then flows through channels in the matching surface of the spindle means and through appropriate channels in the clamping surface of the clamping nut as described above.

Further, in the embodiment of the present invention in which the cutting insert also rotates, the split bushing means is preferably restrained from rotary motion in the aperture of the cutting tool during the cutting operation. Thus, there may be provided a short portion of weld between the split bushing and the body member of the tool for a permanent installation.

In some applications of the present invention it is also desirable to provide both radial as well as axial adjustment. Such radial adjustment can be achieved by providing that the internal threads of the split bushing means are along an axis that is parallel to but spaced apart from the axis of the external surface of the bushing means. In such an embodiment rotation of the stud seat means or the spindle means in the threading engagement with the internal threaded surface of the split bushing means results in radial movement of the cutting insert because of the eccentric mounting of the stud seat means or spindle means with respect to the center line of the bushing which corresponds to the center line of the aperture in the cutting tool. Appropriate pinion gear drive means may be included in the tool means to provide a desired rotation of the split bushing means with such an eccentric mounting in order to provide the radial adjustment. Such rack and pinion type drive is well known in the art and can also be used to lock the bushing in place to prevent rotation of the bushing in, for example, the embodiment of the present invention in which the cutting insert also rotates.

It will be appreciated also that the size of the cutting insert may be varied by varying the size of the clamping nut and the outer end of either the spindle of the stud seat means while providing, in such structure, the same external threads at the inner end for mounting in the split bushing means. Thus, various size cutting inserts may be utilized as desired in the same cutting tool.

BRIEF DESCRIPTION OF THE DRAWINGS

The above and other objects of the present invention may be more fully understood from the following detailed description taken together with the accompanying drawings wherein similar reference characters refer to similar elements throughout and in which:

FIG. 8 is a sectional view showing the embodiment of FIG. 7 installed in a cutting tool;

FIG. 9 illustrates another embodiment of the present invention;

FIG. 10 is an end view of another embodiment of a cutting insert useful in the practice of the present invention;

DESCRIPTION OF THE PREFERRED EMBODIMENTS

Figures 1, 2:
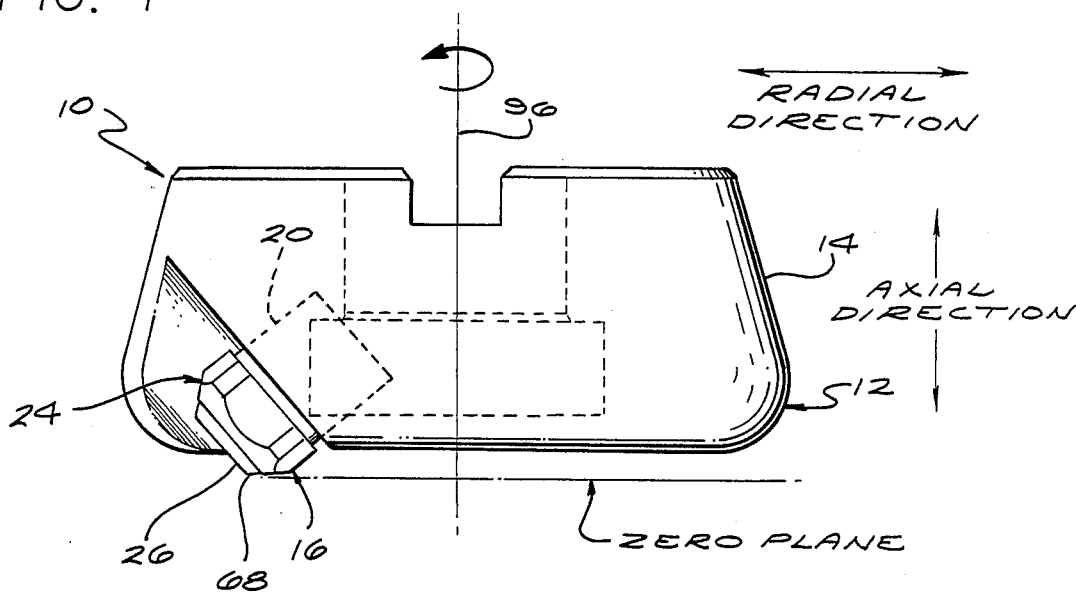
FIG. 1 is a side elevational view of a cutting tool incorporating cutting tool cartridge according to the principles of the present invention.
FIG. 2 is a planned view of the cutting tool shown in FIG. 1.

Referring now to the drawing and in particular to FIGS. 1, 2, 3 and 4 thereof, there is described a preferred embodiment generally designated 10 according to the principles of the present invention. In the embodiment 10 the present invention is illustrated as incorporated in a face mill cutter generally designated 12 having a body member 14. It will be appreciated that the illustration of the present invention in a face mill cutter application as illustrated in the embodiment 10 is not limiting on Applicant's invention. Rather, Applicant's invention may be utilized in any cutting tool in which there is relative cutting movement between the cutting tool and the work piece such as lathes, planers, drilling machines, or the like. In the embodiment 10 the cutting tool 12 is provided with a plurality and as illustrated the plurality is 5, of cutting tool cartridge arrangements generally designated 16 according to the principles of the present invention. Each cutting tool cartridge 16 is mounted in a cutting tool cartridge receiving aperture generally designated 20 in the body member 14 of the tool 12. Each of the cutting tool cartridges 16 is generally comprised of five separate components: a annular split bushing means 22, a stud seat means 24, a frustum cutting insert means 26, a clamping nut 28 and a set screw 30. The annular split bushing means 22 has a predetermined axis generally designated 32, an inner or first end surface generally designated 34 and an outer or second end surface generally designated 36. The annular split bushing means 22 also has an outside surface 38 and a threaded inside surface 40. The annular split bushing means 22 has a pair of spaced apart walls generally designated 41 defining a slot generally designated 42 extending axially from the first end surface 34 to the second end surface 36 and radially from the threaded inside surface 40 to the outside surface 38. For purposes as hereinafter described, the pair of spaced apart walls 40 have a limited resilient movement towards and away from each other. Such limited resilient movement is provided, in this embodiment of the present invention, by the characteristics of the material, such as steel, from which the split bushing means 22 is fabricated.

The stud seat means 24 is mountable in the split bushing means 22 and has a mounting end generally designated 44, an insert end generally designated 46, an outside surface generally designated 48 which has a threaded first portion as indicated by the reference FIG. 50 extending from the mounting end 44 a predetermined distance towards the insert end 46. The threaded outside surface 48 is also provided with a second portion generally designated 52 which extends from the insert and 46 towards the mounting end 44. In the cutting tool cartridge 16 the threads are the same in first portion 50 and second portion 52. The first portion 50 is threaded for threading engagement with the internal threaded surface 40 of the split bushing means 22. The insert end 46 of the stud seat means 24 also has an internal cutting insert matching wall surface generally designated 54.

The frustum cutting insert means 26 may, as noted above, be similar to the conical insert described in my U.S. Pat. No. 4,621,955. As such, the cutting insert means 26 is mountable in the insert end 46 of the stud seat means 24 adjacent the matching surface 54 thereof. The cutting insert means 26 has a medial plane generally designated 56, a cutting edge end 58 and a mounting end 60 which is spaced axially from the cutting edge end 58. The cutting insert 26 has a external flank surface generally designated 62 tapering inwardly from the medial plane 56 towards the axis 32 at the cutting edge end 58. Similarly, the cutting insert 26 also has a mounting surface generally designated 64 tapering inwardly towards the axis 32 from the medial plane 56 to the mounting end 60.

It will be appreciated that the cutting insert means 26 may be "double ended". That is, the mounting end 60 may also be provided with a cutting edge 66 that is the same as the cutting edge 68 at the cutting edge end 58. The cutting insert means 26, in such an embodiment, is, therefore, symmetrical about the medial plane 56. However, for convenience of description, the portion of the cutting insert means 26 which is mounted in the stud seat means 24 adjacent the matching wall 54 is referred to as the mounting end 60 having the mounting surface 64. The matching surface 54 is contoured to match the taper of the mounting surface 64.

The clamping nut 28 mounts on the insert end 46 of the stud seat means 24 and has a stud seat means end generally designated 70 and a clamping end generally designated 72 and first walls generally designated 74 extending from the stud seat means end 70 and defining an internal threaded surface 74 for threading engagement with the second portion 52 of the threaded external surface 48 of the stud seat means 24. The clamping nut means 28 also is provided with second walls generally designated 76 extending from the clamping end 72 towards the stud seat end 70 and defining and internal clamping surface generally designated 78 for clamping engagement with the flank surface 62 of the cutting insert means 26.

The cutting insert means 26 may be positioned in the stud seat means 24 by positioning the mounting surface 64 adjacent the matching surface 54 and the clamping nut 28 may be installed on the stud seat means by threading engagements of the threaded surface 74 with the first portion 52 to ridgely clamp the cutting insert means 26 between the clamping nut means 28 and the stud seat means 24. As shown more clearly in FIG. 4, the split bushing means 22 may be inserted into the cutting insert cartridge receiving aperture 20 of the body member 14 of the tool 12 and the set screw 30 may be inserted to engage the outside surface 38 of the split bushing means 22 to prevent rotation thereof. The assembly of the clamping nut 28, cutting insert 26 and stud seat means 24 may then be threaded into the split bushing means 40 to the desired depth thereof.

According to the principles of the present invention the set screw 30 may then be tightened against the outside surface 38 of the split bushing means 22 causing the opposed walls 41 to move towards each other. Such movement of the opposed walls 41 towards each other forces the threads of the threaded surface 40 into extremely tight clamping engagement with the threads of the external threaded surface 48 in the first portion 50 of the stud seat means 24. It has been found that such clamping engagement between the threads provides an extremely high clamping force to prevent any relative movement between the stud seat means 24 and the split bushing means 22 during operation of the cutting tool 12.

In some embodiments of the present invention it may be desirable to insert the stud seat means 24 into the split bushing means 22 before the installation of the clamping nut means 28 and cutting insert means 26. In order to provide such a threading insertion of the stud seat mans 24 into the split bushing means 22 the stud seat means 24 may be provided with internal walls generally designated 80 defining an internal hex wrench flats for receiving a hex wrench to allow tightening of the stud seat means 24 into the split bushing means 22. In such an embodiment the entire assembly of the stud seat means 24, split bushing means 22, cutting insert means 26 and clamping nut means 28 may be assembled and installed in the cutting insert cartridge receiving aperture 20 as an assembly thereof. The set screw 30 may then be tightened to provide the above described clamping action between the internal threads 40 of the split bushing means 22 and the external threads 48 in the first portion 50 of the stud seat means 24.

In some applications it may be desirable to provide additional restraint for retaining the split bushing means 22 in the cutting insert cartridge receiving aperture 20 of the body member 14 of the tool means 12. Therefore, there may be provided a retaining means generally designated 82 which, for example, may be a snap ring for bearing against the outer or second end surface 36 of the split bushing means 22.

Figure 5:
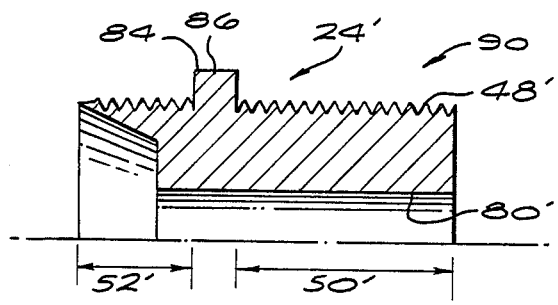
FIG. 5 illustrates another embodiment of a component useful in the practice of the present invention.

As noted above, the means for threading the stud seat means 24 into the split bushing means 22 may comprise the internal hex wrench flats 80. However, FIG. 5 illustrates another embodiment generally designated 90 of a stud seat means generally designated 24' which is generally similar to the stud seat means 24 described above except that the external surface 48' thereof which has a first threaded portion 50' and a second threaded portion 52 prime for the purposes as described above in connection with the first threaded portion 50 and seconded threaded portion 52 of the stud seat means 24, is also provided with a shoulder 84 having a wrench flats 86 which, for example, may be a pair of opposed flat surfaces or the shoulder 84 may be in the form of a conventional hex to allow positioning of a wrench thereon so that the stud seat means 24' may be inserted into the appropriate split bushing means.

Figure 6:
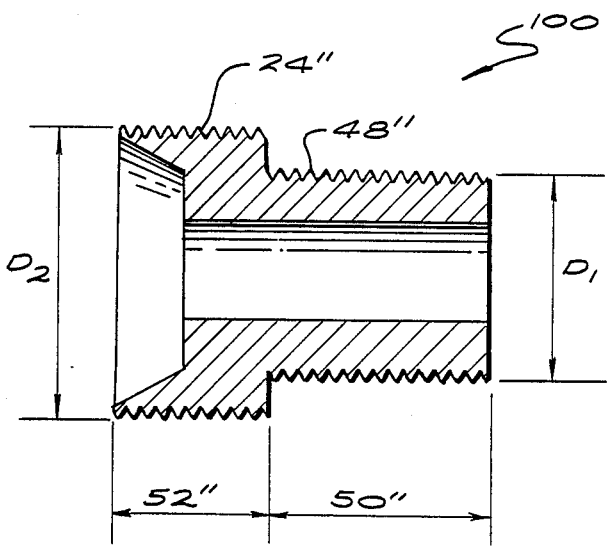
FIG. 6 illustrates another embodiment of a component useful in the practice of the present invention.

In the embodiment 16 of the cutting tool cartridge as described above it can be seen that the thread diameter of the first portion 50 and second portion 52 of the threaded external surface 48 of the stud seat means 24 are the same. However, according to the principles of the present invention and one of the advantages thereof is that the same split bushing means 22 may be utilized with a variety of stud seat means in which different size cutting insert means 26 may be utilized. In FIG. 6 there is illustrated another embodiment generally designated 100 of a stud seat means 24" in which the external surface 48" thereof is threaded but the first portion 50" thereof has a diameter D1 which is smaller than the thread diameter D2 of the second thread portion 52". Thus, a larger cutting insert may be installed in the stud seat means 48" by an appropriately double sized clamping nut means and may still be inserted in the same split bushing means 22 described above. Similarly, the first diameter D1 may be larger than the second diameter D2, depending upon the particular application desired.

Figure 4:
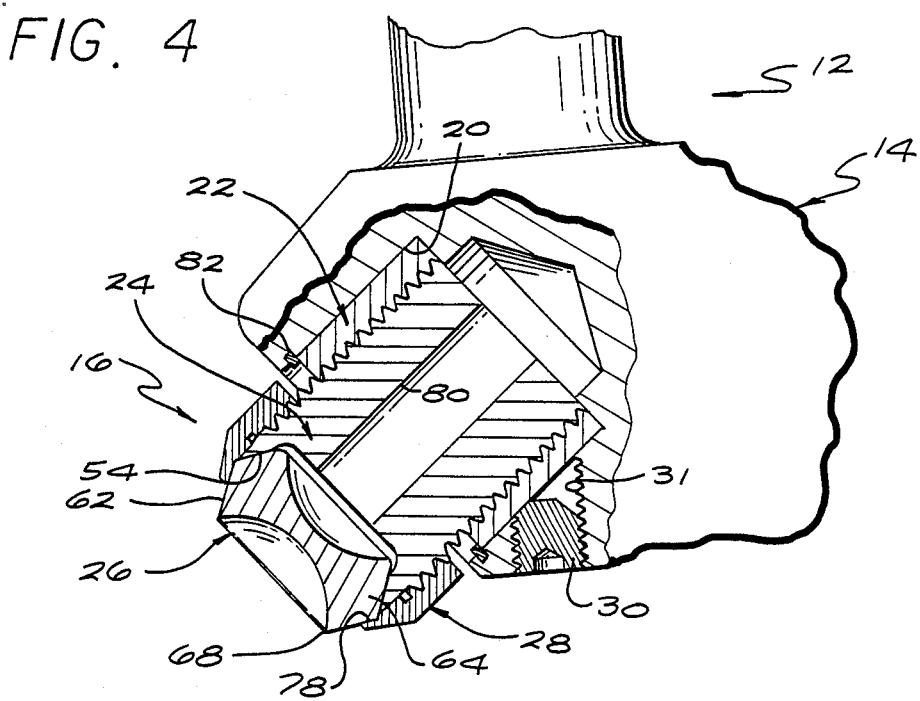
FIG. 4 is a sectional view showing the installation of the cutting tool cartridge assembly of FIG. 3 in a cutting tool.

As shown most clearly in FIG. 4, the cutting insert means 26 is preferably free of walls defining an axially extending aperture therethrough. While cutting inserts having such an aperture may be utilized, in preferred embodiments of the present invention the absence of such an aperture prevents chips generated during the cutting operation from pentrating into the stud seat means 24 and therefore interferring with the desired cutting operation.

As can be seen most clearly from FIG. 4 the insert end 72 of the clamping nut means 28 is smaller than the medial plane 56 of the cutting insert 26 and the clamping walls 78 of the clamping nut means 28 engage the flank surface 62 of the cutting insert means 26 in regions adjacent the medial plane 56. Similarly, the matching walls 54 of the stud seat means 24 engage the mounting walls 64 of the cutting insert means 76 in regions adjacent to medial plane 56.

In FIG. 1 there is illustrated the position of a zero plane. In the cutting tool art adjustments of the cutting insert 26 in the axial direction are made in reference to this zero plane. The zero plane may, of course, be any plane generally perpendicular to the axis of rotation 96 of the cutting tool 10. Adjustment of the cutting edge 68 of the cutting insert 26 with reference to the axial direction to the zero plane may be made to a much higher degree of accuracy according to the principles of the present invention. By threading each of the cutting insert cartridge assemblies 26 into and out of the split bushing means 22 high precision in positioning of the cutting edge 68 of each of the cutting inserts 26 may be achieved. It will be appreciated that such precision may also be achieved in those applications in which a single cutting insert means is utilized in an appropriate cutting tool. It has been found that accuracy of the positioning of each of the cutting edges 68 of the cutting insert means 26.

In some applications of the present invention it is desirable to provide coolant flow adjacent to the cutting edge 68 of the cutting insert 26 during operation of the cutting tool 12. FIGS. 7, 8, 9 and 10 illustrate arrangements for providing such a coolant flow in a cutting tool having a fixed cutting insert means similar to that described above in connection with FIGS. 1 through 6.

Figure 3:
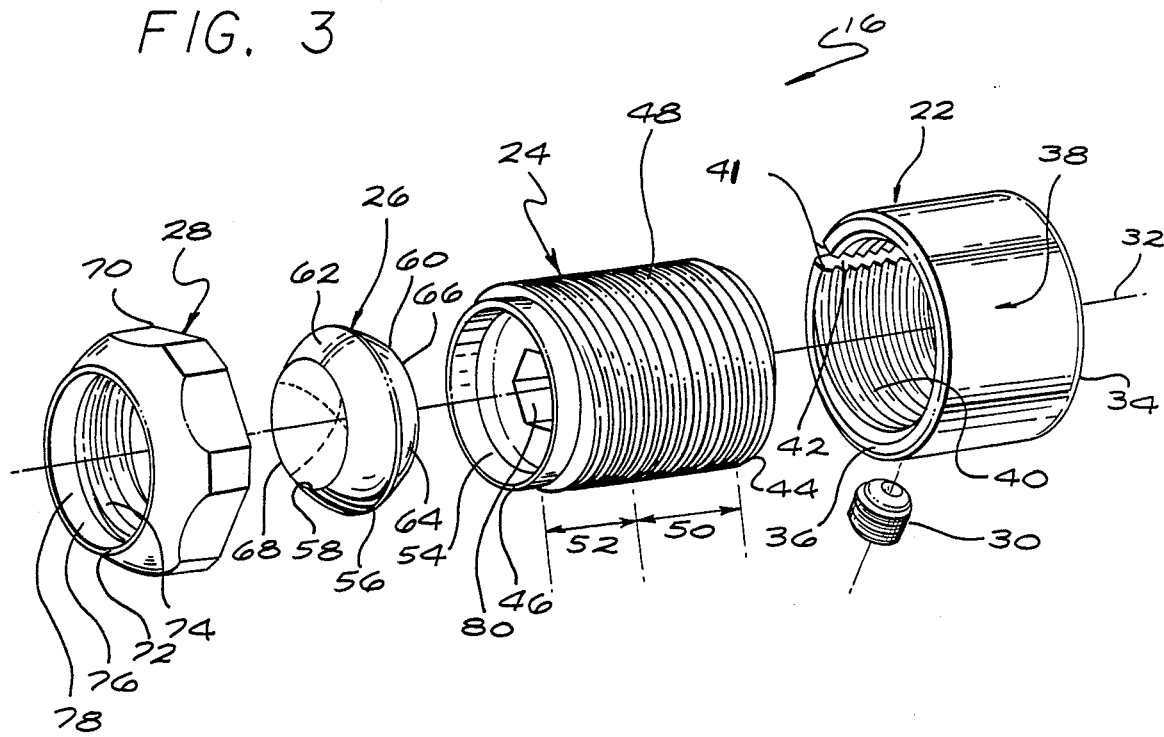
FIG. 3 is an exploded view of a cutting tool cartridge assembly according to the principles of the present invention.
Figure 7:
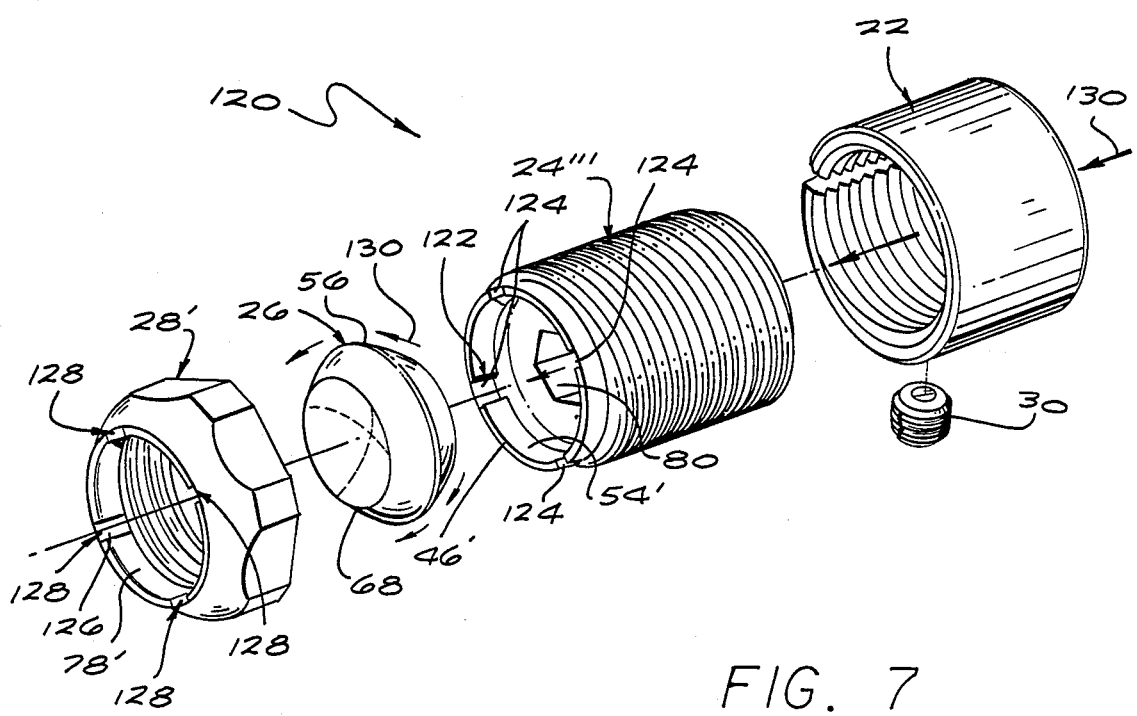
FIG. 7 is an exploded view of another embodiment of the present invention.

In the embodiment 120 shown in FIGS. 7, 8 and 9 the split bushing means 22, set screw 30 and cutting insert means 26 may be the same as described above. However, there is provided a stud seat means generally designated 24''' that is generally similar to the stud seat means of 24 described above and has, for example, the internal hex wrenching walls 80. Alternatively, there may be aperture walls 80' (as shown on FIG. 5) defining a circular or other shaped aperture instead of the hex wrenching aperture as shown in FIG. 3. Additionally, the matching surface 54' of the stud seat means 24''' is provided with walls generally designated 122 defining a plurality of channels generally designated 124 extending axially providing communication between the axial aperture and regions external the insert end 46'. In the embodiment 120 there are four such channels 124.

The clamping nut means 28' also has walls generally designated 126 defining a plurality of channels 128 in the clamping wall 78' thereof.

As shown most clearly in FIGS. 8 and 9, the cutting tool 12' having the body member 14' is provided with an coolant dispensing means such that coolant flows in the direction indicated by the arrows 130 into the central aperture defined by the walls 80 of the stud seat means 24'', through the channels 124 in the stud seat means 24''', around the medial plane 56 of the cutting insert means 26 and through the channels 128 in the clamping wall 78' of the clamping nut means 28'. As illustrated in greater detail in FIG. 9, which is an enlargement of the Section 9 shown on FIG. 8, there is provided a generally annular volume generally designated 132 between regions adjacent the medial plane 56 of the cutting insert 26 and is bounded by the clamping nut means 28' and the stud seat means 24'''. The coolant flows through the annular volume 132 from the channels 124 and into the channels 128. The coolant then exits from the channels 128 immediately adjacent to the cutting edge 68 of the cutting insert 26 to provide coolant flow directly on the work piece (not shown) at the position of cut. If desired, the circumferential extent of each of the channels 128 may be different, for example smaller, than the circumferential extent of each of the channels 124. Alternatively, they may be the same size.

In some applications it may be desirable not to provide the channels 124 in the matching surface 54' of the stud seat means 24'''. In such an embodiment a cutting insert means 26' as illustrated in FIG. 10 may be utilized to provide the desired coolant flow. In such embodiment as illustrated in FIG. 10 the cutting insert 26' has a mounting end 60' and a mounting surface 64'. The mounting surface 64' is provided with walls generally designated 136 defining a plurality of channels 138 therein. It will be appreciated that in utilizing the cutting insert means 26', it is not reversible and only one cutting edge is provided. The channels 138 allow coolant flow past the equatorial plane 56' of the cutting insert means 26' and in through the appropriate channels 128 in the clamping nut 28' when the cutting insert 26' is utilized in an assembly as illustrated in FIG. 9 instead of the cutting insert 26 and the stud seat means 24 of FIG. 3 as utilized therein instead of the stud seat means 24'''.

It will be appreciated that the cutting insert 26 or 26' as may be desired, can be conveniently indexed by merely loosening the clamping nut 28 or 28', rotating the cutting insert and then re-tightening the clamping nut. Further, the tapered flank surface and mounting surface of the frustum shaped cutting inserts utilized in preferred embodiments of the invention become "self-seating" in the stud seat means and the clamping nut means. Thus, high precision and costly high tolerance machining of the various parts can be eliminated because of this self-aligning feature.

As noted above in some cutting tool applications, it is desirable that the cutting insert means rotate during the cutting operation.

Figure 11:
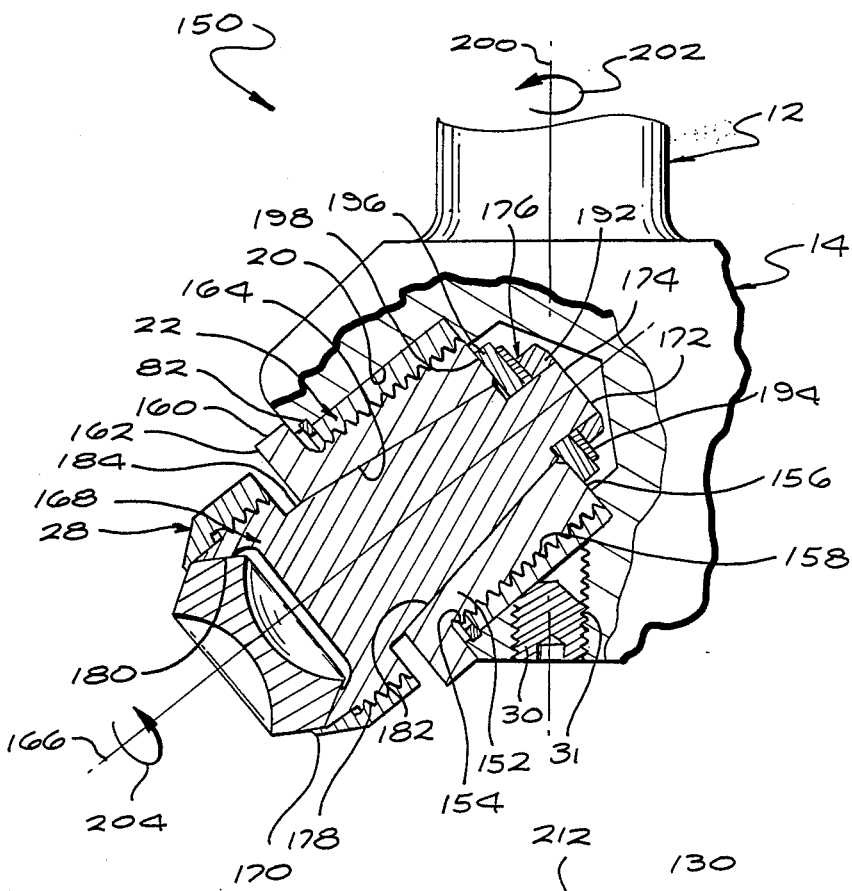
FIG. 11 is a sectional view of another embodiment of the present invention as installed in a cutting tool.

FIG. 11 illustrates an embodiment of the present invention generally designated 150 in which a rotating cutting insert is provided. In the embodiment 150 the cutting tool 12 is provided having a body member 14. The body member 14 has walls defining an internal cartridge receiving aperture 20 therein. It will be appreciated that one or more such cutting insert cartridge receiving aperture 20 may be provided in any tool body 14. A set screw receiving aperture 31 similar to the set screw receiving aperture 31 shown in FIGS. 4 and 8 to receive a set screw 30 for the purposes as described above in connection with, for example, the embodiment 16. A retaining means such as the snap ring 82 may also be provided to retain the split bushing means 22 in the cutting insert cartridge receiving aperture 20 of the body member 14.

A bearing means 152 has an external surface 154 having a threaded portion extending from an inner end 156 to define a first threaded portion generally designated 158. A second shoulder portion 160 is adjacent the outer end 162. The shoulder portion 160 may, for example, be a hex wrench flat configuration to allow threading insertion of the bearing means 152 into the split bushing means 22 so that the first threaded portion 158 of the bearing means 152 threadingly engages the internal threaded surface of the split bushing means 22.

The bearing means 152 also has a tapered bearing surface 164 extending from the outer end 162 inwardly towards the cutting insert cartridge axis 166 at the inner end 156.

A spindle means generally designated 168 is co-axially mountable in the bearing means 152 and has an insert end generally designated 170 and an interior end generally designated 172. The interior end 172 has a thrust bearing mounting portion 174 on which there is mounted a thrust bearing means generally designated 176. The spindle means also has a first threaded portion generally designated 178 at the insert end 170 which serves the same function as the second threaded portion 52 of the stud seat means 24 of the embodiment 16 described above for threading engagement with a clamping nut means 28. Similarly, the insert end 170 of the spindle means 152 is also provided with internal matching walls 180 which are the same as the matching walls 54 of the stud seat means 24 of the embodiment 16 described above for receiving a cutting insert 26 thereagainst.

The spindle means 168 also has an external bearing surface 182 for engaging the internal bearing surface 164 of the bearing means 152 for relative rotary motion therebetween about the axis 166. The external bearing surface 182 extends from a second boss portion 184 of the spindle means 168 to the thrust bearing mounting portion 174 thereof. The second boss portion 184 is intermediate the external bearing surface 182 and the first threaded portion 178. The second boss portion may, for example, have wrench flats thereon so that the spindle means 168 may be held stationary while the clamping nut 28 is loosened or tightened to allow insertion or clamping of the cutting insert 26. The spindle means end 190 of the clamping nut means 28 is the same as the stud seat means end 70 described above.

The thrust bearing means comprises a thrust retainer generally designated 192, a conical spring washer 194 which, for example, may be of a Belleville washer, and a thrust bearing generally designated 196. Anti-rotation means are provided by, for example, having a flat surface extending axially on the thrust bearing portion 174 of the spindle means 168 and a corresponding flat on the thrust retainer 192, spring washer 194 and thrust bearing 196. Alternatively, the external surface of the thrust bearing mounting portion 174 of the spindle means 168 may be threaded and the thrust retainer 192 provided with internal threads for threading engagement with the external threads on the thrust bearing mounting portion 174 of the spindle means 168. The thrust retainer may then, for example, be welded into place when the desired compression of the conical spring washer 194 is achieved upon assembly of the cutting insert cartridge of this embodiment.

To provide better rotation characteristics, in preferred embodiments of the present invention the bearing surfaces of the spindle means 168, bearing means 152 and the bearing surface 198 of the thrust bearing 196 may be coated with a hard facing bearing material such as those selected from the class consisting of titanium nitrite, silicone nitride, boron, titanium carbide, silicone carbide, ceramic, or the like.

It will be appreciated that the diameter of the first threaded portion 178 of the spindle means 168 may be made larger or smaller than the diameter of the first threaded portion 158 of the bearing means 152 in order that larger or smaller cutting inserts 26 may be utilized in the same cutting tool 12 as desired.

Thus, during rotation of the cutting tool 12 about the axis 200 in a direction indicated by the arrow 202, the cutting insert 26 may rotate about the axis 166 in the direction indicated by the arrow 204. It will be appreciated that axial adjustment towards and away from a zero plane (not shown) similar to that illustrated in FIG. 1 may be achieved by threading adjustment of the bearing means 152 in the split bushing means 22.

Figure 12:
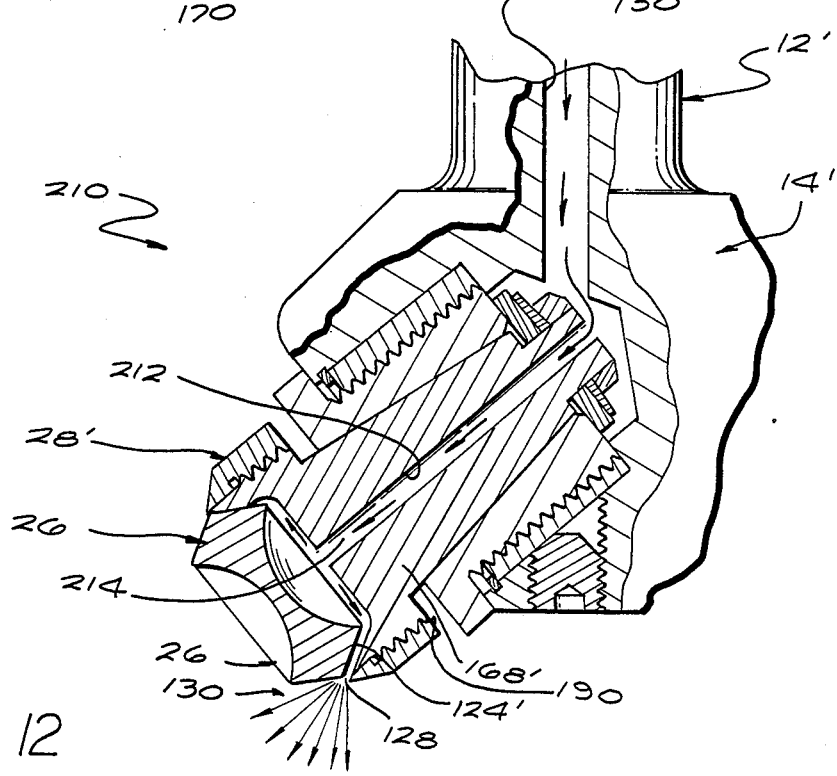
FIG. 12 is a sectional view of another embodiment of the present invention as installed in a cutting tool.

FIG. 12 illustrates another enbodiment of the present invention generally designated 210, substantially similar to the enbodiment 150 except that it incorporates a coolant flow such as that described above in connection with FIGS. 7 and 8. Thus, the tool means 12' has a coolant dispensing means for dispensing coolant in the directions indicated by the arrow 130 through an aperture 212. The spindle means 168' is provided with internal walls designated 212 defining an axial aperture 214 through which the coolant flows. In this embodiment the spindle means 168' has walls defining channels 124' and the clamping nut 28' has channels 128 therein as illustrated in FIG. 9 to allow the flow of the coolant therefrom adjacent the cutting insert means 26.

It will be appreciated, of course, that a clamping nut 28 may be utilized in the embodiment 210 and a cutting insert 26' as illustrated in FIG. 10 may be utilized in conjunction therewith.

Figure 13:
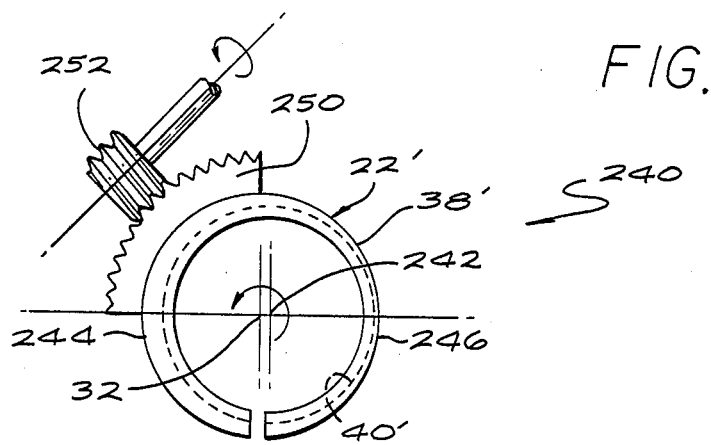
FIGS. 13 and 14 illustrate another embodiment of a component useful in the practice of the present invention.
Figure 14:
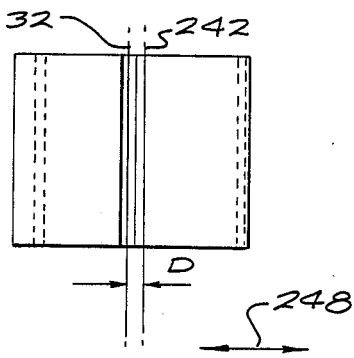

As noted above in connection with the description of FIG. 1, axial movement of the cutting insert in the tool to provide precision adjustment with respect to the zero plane is achieved by threading movement of the stud seat means in the split bushing means, or, alternatively, for the embodiments 150 and 210 the movement of the bearing means with respect to the split bushing means. In some applications, however, it is desired to provide a means for radial positioning of the cutting insert. By providing both radial positioning means and axial positioning means it will be appreciated that a high degree of positioning of the cutting insert with respect to, for example, the center line of a tool, may be achieved. FIGS. 13 and 14 illustrate an embodiment generally designated 240 of a split bushing means 22' generally similar to the split bushing means 22 described above. However, in the split bushing means 22' the internal threaded surface thereof generally designated 40' is not co-axial along the axis 32 of outside surface 38' but is eccentric with respect thereto along the axis 242 which is spaced parallel to the axis 32 but a distance D therefrom. This eccentric arrangement provides a thicker wall of the split bushing means in regions generally designated 244 as compared with the thickness of the wall in the regions generally designated 246. It will be appreciated that by proper positioning of the split bushing means 22' in the cartridge receiving apertures 20 of the tool 12 or 12' a desired radial position may be obtained. It will be appreciated that the total radial adjustment thus permitted is twice the dimension D and can be achieved in the direction indicated in the double-ended arrow 248.

In other embodiments of the present invention a rack means generally designated 250 may be provided on the external surface 38' of the split bushing means 22' in extending, as shown, 90 degrees. A pinion drive generally designated 252 and illustrated in FIG. 13 in schematic form may be included in the tool means 12 or 12' for rotating the split bushing means 22' about the axis 32 to provide the radial movement in the direction of the arrow 248. The split bushing means 22' may, of course, as noted, be utilized in both the fixed cutting insert embodiments of the present invention as well as the rotating cutting insert embodiments of the present invention.

Figure 15:
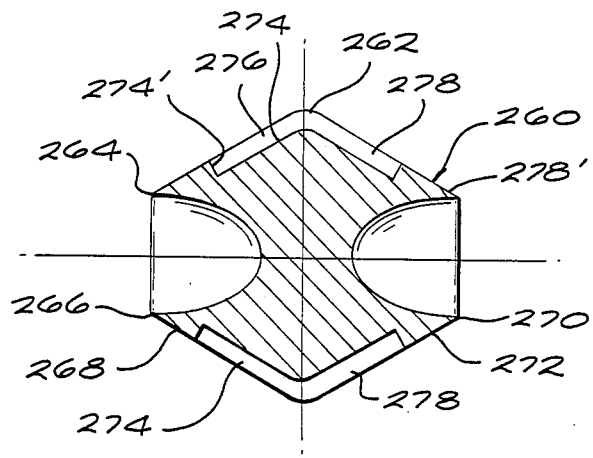
FIG. 15 is a sectional view of another embodiment of a cutting insert useful in the practice of the present invention.

In addition to the coolant flow means arrangements as described above, it has been found that in some applications it may not be desirable to provide the channels in the clamping nut means and/or the spindle means and/or the stud seat means. In such embodiments a cutting insert similar to the cutting insert 26 prime illustrated in FIG. 10 may be utilized. However, such cutting insert would have channels cut in both the mounting surface and the flank surface. As illustrated in FIG. 15, there is provided a cutting insert generally designated 260 according to the principles of the present invention. The cutting insert 260 is generally similar to the cutting inserts 26 and 26' described above having a medial plane 262, a cutting end 264, having a cutting edge 266 and a flank surface 268 extending between the medial plane and the cutting edge 266. A mounting end 270 is spaced from the medial plane 262 and there is provided a mounting surface 272 extending between the medial plane 262 and the mounting end 270. The cutting insert 260 has walls 274 defining interconnected channels 276 in the flank surface 268 and 278 in the mounting surface 272. The channels 276 and 278 do not extend to the cutting edge 266 or the mounting edge 270. Further, in embodiments utilizing the cutting insert means 260 it is preferred that the region adjacent the end wall 278' of the channel 278 be left free of engagement with the stud seat means or spindle means as the case may be to allow the flow of coolant therein and that the portion of the channels 274 in regions adjacent the end wall 274' thereof be left free of engagement with the clamping nut 28 to allow the flow of coolant from the channels 274 and on to the cutting edge 266 during the cutting operation.

From the above it can be seen that there has been provided an improved cutting tool cartridge arrangement that can provide a high degree of axial and if desired axial and radial positioning accuracy, as composed of comparatively few parts and may be utilized interchangeably in both rotating cutting insert and fixed cutting insert applications. Accordingly, the following claims are intended to cover all variations and adaptations thereof falling within the true scope and spirit of the present invention.

What is claimed is:

1. An improved cutting tool cartridge arrangement comprising, in combination:
 an annular bushing means having a predetermined axis, a first end surface and second end surface and said second end surface axially spaced a predetermined distance from said first end surface, an outside surface, a threaded inside surface, a pair of spaced apart walls defining a slot extending axially from said first end surface to said second end surface and radially from said outside surface to said inside surface, and said pair of spaced apart walls having limited resilient movement towards and away from each other;
 stud seat means mountable in said bushing means and having a mounting end and an insert end, an outside surface extending axially from said mounting end to said insert end, said outside surface having a first threaded portion extending axially a first preselected distance from said mounting end for threading engagement with said threaded inside surface of said bushing means, and a second threaded portion extending from said insert end, and said insert end having an internal cutting insert matching wall surface;
 cutting insert means mountable in said insert end of said stud seat means and having a medial plane, a cutting edge end and a mounting end spaced axially a predetermined distance from said cutting edge end, an external flank surface tapering inwardly from said medial plane to said cutting edge end, an external mounting surface tapering inwardly from said medial plane to said mounting end, said mounting surface of said cutting insert means positionable contiguous said matching surface of said stud seat means; and
 a clamping nut means having a stud seat means end and a clamping end, first walls extending from said stud seat means end defining an internal threaded surface for threading engagement with said second threaded portion of said stud seat means, second walls extending from said insert end defining an internal clamping surface for clamping engagement with said flank surface of said cutting insert;
 whereby said cutting insert is rigidly clamped between said clamping nut means and said stud seat means.

2. The arrangement defined in claim 1, wherein: said first threaded portion has a first diameter and said second threaded portion has a second diameter different than said first diameter.

3. The arrangement defined in claim 2, wherein: said second diameter is larger than said first diameter.

4. The arrangement defined in claim 2, wherein: said second diameter is smaller than said first diameter.

5. The arrangement defined in claim 2, wherein: said stud seat means further comprises:
 means for threading said first threaded portion into said threaded inside surface of said bushing means.

6. The arrangement defined in claim 5, wherein: said means for threading comprises wrench walls defining a hex wrench aperature extending from regions adjacent said insert end towards said mounting end thereof.

7. The arrangement defined in claim 5, wherein: said means for threading comprises wrench flats on said external surface of said stud seat means intermediate said first threaded portion and said second threaded portion.

8. The arrangement defined in claim 1, wherein: said clamping walls of said clamping nut engage said flank surface of said cutting insert means in regions adjacent said medial plane of said cutting insert means.

9. The arrangement defined in claim 1, wherein:
said matching walls of said stud seat means engage said mounting surface of said cutting insert means in regions adjacent said medial plane of said cutting insert.

10. The arrangement defined in claim 1, wherein:
said cutting insert is a nonapertured free of walls defining an axial aperature there through.

11. The arrangement defined in claim 1, wherein:
said insert end of said clamping nut is smaller than said medial plane of said cutting insert.

12. The arrangement defined in claim 1, wherein:
said stud seat means has internal walls defining a internal aperture extending from said mounting end to said insert end to provide communication between regions external said mounting end and said internal cutting insert matching wall surface thereof;
said cutting insert matching wall surface of said stud seat means further comprises channel walls defining a plurality of axially extending channels therein; and
said clamping surface of said clamping nut means further comprises channel walls defining axially extending channels therein.

13. The arrangement defined in claim 12, wherein:
the peripheral circumferential extent of each of said channels in said matching wall of said stud seat means is greater than the peripheral circumferential extent of said channels in said clamping surface of said clamping nut means.

14. The arrangement defined in claim 1, wherein:
said stud seat means has internal walls defining an internal aperature extending from said mounting end to said insert end to provide communication between regions external said mounting end and said internal cutting insert matching wall surface thereof; and
said mounting surface of said cutting insert means further comprises walls defining a plurality of channel means extending from said medial plane to said mounting end and providing communication therebetween;
said clamping surface of said clamping nut means further comprises channel walls defining a plurality of axially extending channels therein.

15. An improved cutting tool arrangement comprising, in combination:
a body member having of first walls defining at least one cutting tool cartridge receiving aperture means therein;
second walls defining a threaded set screw receiving aperture means providing communication from regions external said body means to said at least one cartridge receiving aperture means;
a cutting tool cartridge mountable in said cutting tool cartridge receiving aperture means of said body member, and said cutting tool cartridge further comprising:
an annular bushing means having a predetermined axis, a first end surface and second end surface and said second end surface axially spaced a predetermined distance from said first end surface, an outside surface, a threaded inside surface, a pair of spaced apart walls defining a slot extending axially from said first end surface to said second end surface and radially from said outside surface to said inside surface, and said pair of spaced apart walls having limited resilient movement towards and away from each other;
stud seat means mountable in said bushing means and having a mounting end and an insert end, an outside surface extending axially from said mounting end to said insert end, said outside surface having a first threaded portion extending axially a first preselected distance from said mounting end for threading engagement with said threaded inside surface of said bushing means, and a second threaded portion extending from said insert end, and said insert end having an internal cutting insert matching wall surface;
cutting insert means mountable in said insert end of said stud seat means and having a medial plane, a cutting edge end and a mounting end spaced axially a predetermined distance from said cutting edge end, an external flank surface tapering inwardly from said medial plane to said cutting edge end, an external mounting surface tapering inwardly from said medial plane to said mounting end, said mounting surface of said cutting insert means positionable contiguous said matching surface of said stud seat means; and
a clamping nut means having a stud seat means end and a clamping end, first walls extending from said stud seat means and defining an internal threaded surface for threading engagement with said second threaded portion of said stud seat means, second walls extending from said insert end defining an internal clamping surface for clamping engagement with said flank surface of said cutting insert;
whereby said cutting insert is rigidly clamped between said clamping nut means and said stud seat means;
retaining means for retaining said split bushing means and said aperture of said body means;
set screw means in said set screw receiving aperture for engagement with said outer surface of said bushing means to force said opposed walls thereof towards each other.

16. The arrangement defined in claim 15, wherein:
said first threaded portion has a first diameter and said second threaded portion has a second diameter different than said first diameter.

17. The arrangement defined in claim 16, wherein:
said second diameter is larger than said first diameter.

18. The arrangement defined in claim 16, wherein:
said second diameter is smaller than said first diameter.

19. The arrangement defined in claim 15, wherein:
said stud seat means further comprises:
means for threading said first threaded portion into said threaded inside surface of said bushing means.

20. The arrangement defined in claim 15, wherein:
said cutting insert is a nonapertured free of walls defining an axial aperture there through.

21. The arrangement defined in claim 15, wherein:
said insert end of said clamping nut is smaller than said medial plane of said cutting insert.

22. The arrangement defined in claim 15, wherein:
said clamping walls of said clamping nut engage said flank surface of said cutting insert means in regions adjacent said medial plane of said cutting insert means.

23. The arrangement defined in claim 15, wherein:
said matching walls of said stud seat means engage said mounting surface of said cutting insert means in regions adjacent said medial plane of said cutting insert.

24. The arrangement defined in claim 15, wherein:
said means for threading comprises wrench walls defining a hex wrench aperture extending from regions adjacent said insert end towards said mounting end thereof.

25. The arrangement defined in claim 15, wherein:
said means for threading comprises of wrench flats on said external surface of said stud seat means intermediate said first threaded portion and said second threaded portion.

26. The arrangement defined in claim 15, wherein:
said stud seat means has internal walls defining an internal aperture extending from said mounting end to said insert end to provide communication between regions external said mounting end and said internal cutting insert matching wall surface thereof;
said cutting insert matching wall surface of said stud seat means further comprises channel walls defining a plurality of axially extending channels therein; and
said clamping surface of said clamping nut means further comprises channel walls defining axially extending channels therein.

27. The arrangement defined in claim 26, wherein:
the peripheral circumferential extent of each of said channels in said matching wall of said stud seat means is greater than the peripheral circumferential extent of said channels in said clamping surface of said clamping nut means.

28. The arrangement defined in claim 26 and further comprising:
coolant dispensing means for dispensing coolant throught said aperture in said stud seat means, through said channels in said matching wall of said stud seat means, and through said channels in said clamping surface of said clamping nut means.

29. The arrangement defined in claim 15, wherein:
said stud seat means has internal walls defining a internal aperture extending from said mounting end to said insert end to provide communication between regions external said mounting end and said internal cutting insert matching wall surface thereof;
said mounting surface of said cutting insert means further comprises walls defining a plurality of channel means extending from said medial plane to said mounting end and providing communication therebetween; and
said clamping surface of said clamping nut means further comprises channel walls defining a plurality of axially extending channels therein.

30. The arrangement defined in claim 28, wherein:
said body means further comprises coolant dispensing means for dispensing coolant fluid through said aperture in said stud seat means, through said channels in said mounting surface of said cutting insert means and through said channels in said clamping surface of said clamping nut means.

* * * * *